United States Patent
Gonnet et al.

(10) Patent No.: US 11,780,762 B2
(45) Date of Patent: Oct. 10, 2023

(54) METHOD FOR MANUFACTURING A PREFORM FOR OPTICAL FIBERS

(71) Applicant: Prysmian S.p.A., Milan (IT)

(72) Inventors: Cedric Gonnet, Billy Berclau (FR); Antonio Adigrat, Battipaglia (IT); Franco Cocchini, Battipaglia (IT); Antonio Schiaffo, Battipaglia (IT); Igor Milicevic, Eindhoven (NL); Mattheus Jacobus Nicolaas Van Stralen, Eindhoven (NL); Gertjan Krabshuis, Eindhoven (NL)

(73) Assignee: Prysmian S.p.A., Milan (IT)

( * ) Notice: Subject to any disclaimer, the term of this patent is extended or adjusted under 35 U.S.C. 154(b) by 585 days.

(21) Appl. No.: 16/081,244

(22) PCT Filed: Mar. 3, 2016

(86) PCT No.: PCT/EP2016/054598
§ 371 (c)(1),
(2) Date: Aug. 30, 2018

(87) PCT Pub. No.: WO2017/148528
PCT Pub. Date: Sep. 8, 2017

(65) Prior Publication Data
US 2019/0084865 A1   Mar. 21, 2019

(51) Int. Cl.
*C03B 37/018*   (2006.01)
*C03B 37/012*   (2006.01)
(Continued)

(52) U.S. Cl.
CPC .... *C03B 37/0183* (2013.01); *C03B 37/01291* (2013.01); *C03B 37/01294* (2013.01);
(Continued)

(58) Field of Classification Search
CPC .................................................. C03B 37/018
See application file for complete search history.

(56) References Cited

U.S. PATENT DOCUMENTS 3,932,162 A * 1/1976 Blankenship ..... C03B 37/01211
65/421
4,233,052 A * 11/1980 Dominick ......... C03B 37/01493
118/730
(Continued)

FOREIGN PATENT DOCUMENTS

EP   1544175 A1   6/2005
EP   1813581 A1   8/2007
(Continued)

OTHER PUBLICATIONS

Saito et al., JP H05117092 machine translation, Single Crystal Silicon Having Resistance Value, Oct. 1991 (Year: 1991).*
(Continued)

*Primary Examiner* — Queenie S Dehghan
(74) *Attorney, Agent, or Firm* — Additon, Pendleton & Witherspoon, P.A.

(57) ABSTRACT

The present invention relates to a method for manufacturing a preform for optical fibers, which method comprises the sequential steps of: i) deposition of non-vitrified silica layers on the inner surface of a hollow substrate tube; ii) deposition of vitrified silica layers inside the hollow substrate tube on the inner surface of the non-vitrified silica layers deposited in step i); iii) removal of the hollow substrate tube from the vitrified silica layers deposited in step ii) and the non-vitrified silica layers deposited in step i) to obtain a deposited tube; iv) optional collapsing said deposited tube obtained in step iii) to obtain a deposited rod comprising from the periphery to the center at least one inner optical cladding and an optical core; v) preparation of an interme-
(Continued)

diate layer by the steps of: * deposition of non-vitrified silica layers on the outside surface of the deposited tube obtained in step iii) or deposited rod obtained in step iv) with a flame hydrolysis process in an outer reaction zone using glass-forming precursors, and subsequently; * drying and consolidating said non-vitrified silica layers into a vitrified fluorine-doped silica intermediate cladding layer; and * in case preceding step iv) was omitted collapsing; to provide a solid rod comprising from the periphery to the center the intermediate layer, at least one inner optical cladding and an optical core; wherein a fluorine-comprising gas is used during the deposition and/or drying and/or consolidating and wherein the intermediate layer has a ratio between the outer diameter of the intermediate cladding layer (C) to the outer diameter of the optical core (A) that is at least 3.5; vi) deposition of natural silica on the outside surface of the intermediate cladding layer of the solid rod obtained in step v) by melting natural silica particles in an outer deposition zone to produce an outer cladding whereby a preform is obtained.

20 Claims, 1 Drawing Sheet

(51) Int. Cl.
*C03B 37/014* (2006.01)
*C03B 37/027* (2006.01)
(52) U.S. Cl.
CPC .. *C03B 37/01446* (2013.01); *C03B 37/01453* (2013.01); *C03B 37/01473* (2013.01); *C03B 37/01493* (2013.01); *C03B 37/01853* (2013.01); *C03B 37/01869* (2013.01); *C03B 37/01892* (2013.01); *C03B 37/027* (2013.01); *C03B 2201/12* (2013.01); *C03B 2201/31* (2013.01); *C03B 2203/23* (2013.01); *C03B 2203/24* (2013.01)

(56) References Cited

U.S. PATENT DOCUMENTS

| | | | | |
|---|---|---|---|---|
| 4,810,276 A * | 3/1989 | Gilliland | ........... | C03B 37/01446 65/31 |
| 4,822,136 A * | 4/1989 | Hicks, Jr. | ........... | C03C 13/045 385/142 |
| 4,852,968 A * | 8/1989 | Reed | ........... | G02B 6/0365 385/127 |
| 4,941,905 A * | 7/1990 | Narasimham | ......... | C03B 37/016 65/421 |
| 5,154,745 A * | 10/1992 | Le Sergent | ....... | C03B 37/01426 216/24 |
| 7,946,134 B2 * | 5/2011 | Atkins | ........... | C03B 37/01869 65/412 |
| 9,816,178 B2 | 11/2017 | Milicevic et al. | | |
| 9,816,179 B2 | 11/2017 | Milicevic et al. | | |
| 2002/0197005 A1 * | 12/2002 | Chang | ........... | C03C 25/00 385/24 |
| 2003/0172681 A1 | 9/2003 | Guskov et al. | | |
| 2003/0221459 A1 * | 12/2003 | Walczak | ........... | C03B 37/0146 65/398 |
| 2005/0262876 A1 * | 12/2005 | Jourdier | ........... | G02B 6/03627 65/391 |
| 2006/0081004 A1 * | 4/2006 | Ishikawa | ........... | C03B 37/01291 65/17.4 |
| 2008/0031582 A1 | 2/2008 | Gonnet et al. | | |
| 2010/0189398 A1 | 7/2010 | Gonnet et al. | | |
| 2010/0189928 A1 | 7/2010 | Gonnet et al. | | |
| 2011/0058780 A1 | 3/2011 | Han et al. | | |
| 2015/0329403 A1 * | 11/2015 | Adigrat | ........... | C03B 37/0126 65/421 |
| 2016/0152509 A1 | 6/2016 | Milicevic et al. | | |
| 2016/0185649 A1 * | 6/2016 | Gonnet | ........... | C03C 25/1068 428/389 |
| 2016/0186316 A1 | 6/2016 | Milicevic et al. | | |
| 2016/0214884 A1 * | 7/2016 | Inoue | ........... | C03B 37/01228 |

FOREIGN PATENT DOCUMENTS

| | | |
|---|---|---|
| WO | 03/078341 A1 | 9/2003 |
| WO | 2014/101949 A1 | 7/2014 |
| WO | 2015/002530 A1 | 1/2015 |
| WO | 2017/148528 A1 | 9/2017 |

OTHER PUBLICATIONS

Orcel et al. CN 1223533 machine translation, Method for Preparing Large Capacity Optical Fiber Using Modified Chemical Vapor Deposition, Oct. 2005. (Year: 2005).*
International Search Report in counterpart International Application No. PCT/EP2016/054598 dated Nov. 9, 2016, pp. 1-3.
Written Opinion in counterpart International Application No. PCT/EP2016/054598 dated Nov. 8, 2016, pp. 1-7.
Mu et al., "Study of Trench-Assisted Single Mode Optical Fiber", Beijing University of Posts and Telecommunications, Beijing, China, IEEE Explore, pp. 627-629 (2013).

* cited by examiner

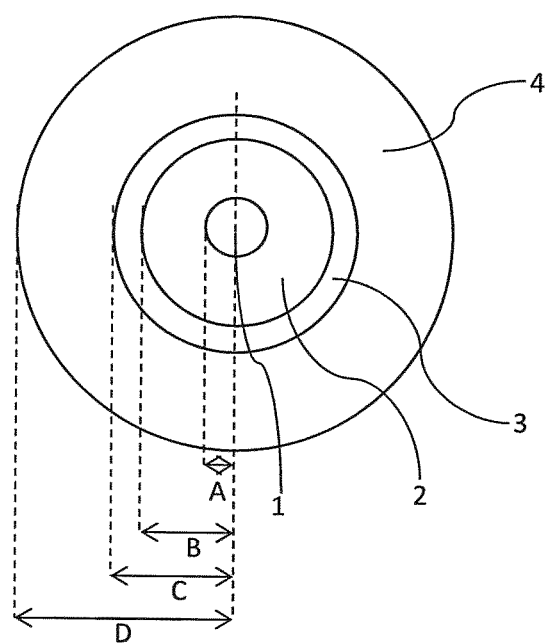

METHOD FOR MANUFACTURING A PREFORM FOR OPTICAL FIBERS

The present invention relates to a method for manufacturing a preform for optical fibers. The present invention moreover relates to the preform thus obtained and to optical fibers obtained therefrom. The present teaching relates to the field of manufacturing optical fibers by means of chemical vapor deposition (CVD) in which layers of silica are deposited on a substrate; examples thereof are modified chemical vapor deposition (MDVD), plasma-enhanced chemical vapor deposition (PECVD or PCVD) and outside vapor deposition (OVD).

BACKGROUND

From WO2015/002530 of the present applicant is known a method for manufacturing a primary preform precursor, wherein the method comprises the steps of: i) providing a hollow substrate tube; ii) creating a first plasma reaction zone having first reaction conditions in the interior of said hollow substrate tube by means of electromagnetic radiation for effecting the deposition of non-vitrified silica layers on the inner surface of said hollow substrate tube, and subsequently; iii) creating a second plasma reaction zone having second reaction conditions in the interior of said hollow substrate tube by means of electromagnetic radiation for effecting the deposition of vitrified silica layers on the non-vitrified silica layers deposited in step ii); iv) removing the hollow substrate tube from the vitrified silica layers deposited in step iii) and the non-vitrified silica layers deposited in step ii) to obtain a deposited tube.

Commercially available substrate tubes are difficult to obtain in sufficient quality due to a dual constraint; firstly the substrate tube has to have a certain purity of the glass used and secondly the substrate tube has to provide certain dimensions of the outer and inner diameter and these dimensions have to be within very narrow margins over the length of the substrate tube. The substrate tube becomes part of the preform and hence will end up in the optical fiber; the purity has to be sufficiently high to avoid attenuation of the optical signal.

SUMMARY

In an aspect, the present invention relates to a method for manufacturing a preform for optical fibers, which method comprises the sequential steps of:
i) deposition of non-vitrified silica layers on the inner surface of a hollow substrate tube by an inner plasma reaction zone having first reaction conditions which inner plasma reaction zone is created in the interior of said hollow substrate tube by means of electromagnetic radiation;
ii) deposition of vitrified silica layers inside the hollow substrate tube on the inner surface of the non-vitrified silica layers deposited in step i) by a inner plasma reaction zone having second reaction conditions which inner plasma reaction zone is created in the interior of said hollow substrate tube by means of electromagnetic radiation for forming from the periphery to the center at least an inner optical cladding layer and an optical core layer;
iii) removal of the hollow substrate tube from the vitrified silica layers deposited in step ii) and the non-vitrified silica layers deposited in step i) to obtain a deposited tube;
iv) optional collapsing said deposited tube obtained in step iii) to obtain a deposited rod comprising from the periphery to the center at least one inner optical cladding and an optical core;
v) preparation of an intermediate layer by the steps of:
deposition of non-vitrified silica layers on the outside surface of the deposited tube obtained in step iii) or deposited rod obtained in step iv) with a flame hydrolysis process in an outer reaction zone using glass-forming precursors, and subsequently;
drying and consolidating said non-vitrified silica layers into a vitrified fluorine-doped silica intermediate cladding layer; and
in case preceding step iv) was omitted collapsing;
to provide a solid rod comprising from the periphery to the center the intermediate layer, at least one inner optical cladding and an optical core; wherein a fluorine-comprising gas is used during the deposition and/or drying and/or consolidating and wherein the ratio between the outer diameter of the intermediate cladding layer (C) to the outer diameter of the optical core (A) is at least 3.5;
vi) deposition of natural silica on the outside surface of the intermediate cladding layer of the solid rod obtained in step v) by melting natural silica particles in an outer deposition zone to produce an outer cladding whereby a preform is obtained.

More aspects and embodiments of the present invention are disclosed in the appended claims and the following detailed description.

SHORT DESCRIPTION OF DRAWING

FIG. 1 is a cross section of a preform according to the present invention.

DEFINITIONS

The following definitions are used in the present description and claims to define the stated subject matter. Other terms not cited below are meant to have the generally accepted meaning in the field.

"hollow substrate tube" as used in the present description means: a, preferably elongated, tube having a cavity within. The inside of said tube may be provided (or coated) with a plurality of glass layers during the manufacturing of a preform.

"preform" as used in the present description means: a solid rod (solid composite preform) or final preform that can be directly used for drawing of optical fibers therefrom.

"deposited tube" as used in the present description means: a hollow tube that is constituted of vitrified silica layers; said silica layers have been deposited inside of a substrate tube that has been subsequently removed. In other words, the substrate tube does not form part of the deposited tube.

"deposited rod" as used in the present description means: a solid rod that is obtained by collapsing a deposited tube. The substrate tube does not form part of the deposited rod.

"inner surface" as used in the present description means: the inside surface or interior surface of the hollow substrate tube.

"silica" as used in the present description means: any substance in the form of SiOx, whether or not stoichiometric, and whether or not crystalline or amorphous.

"synthetic silica" as used in the present description means: an amorphous silica; it is obtained from a chemical synthesis reaction in which a precursor comprising silicon atoms reacts with oxygen to form silica. Synthetic silica has a higher purity than natural silica. Synthetic silica has a higher cost than natural silica. It may be known as SAS (synthetic amorphous silica).

"natural silica" as used in the present description means: crystalline silica that occurs in nature, e.g. in the form of quartz or rock crystal. This is e.g. ground or milled to obtain particles of natural silica. Particles of natural silica having a particle size distribution of 95% of the particles having a size of up to 400 micrometer measured by a laser diffraction technique may be used. This is called fine natural silica in the present description. Natural silica has a lower cost than synthetic silica.

"glass-forming precursors" as used in the present description means: reactive compounds or compositions that are used during the deposition process to react with oxygen to form oxides that can be transformed into glass layers. Examples thereof are silicon halides, e.g. $SiCl_4$ or cyclopolydimethylsiloxanes, e.g. octamethylcyclotetrasiloxane (OMCTS).

"fluorine-comprising gas" as used in the present description means: a gas containing fluorine and/or one or more fluorinated compounds, being compounds comprising at least one bound fluorine atom, e.g. a fluorinated hydrocarbon or sulfur hexafluoride ($SF_6$).

"doped glass layers" as used in the present description means: glass layers comprising a dopant, being a compound or composition that is present in the glass of the optical fibre and that has an effect on the refractive index of said glass. It can for example be a down-dopant, viz. a dopant decreasing the refractive index, such as Fluorine or Boron (e.g. introduced as a precursor in the form of $F_2$, $C_2F_8$ $SF_6$, $C_4F_8$ or $BCl_3$). It can for example be an up-dopant, viz. a dopant increasing the refractive index, such as Germanium (e.g. introduced as a precursor in the form of $GeCl_2$ (germanium dichloride) or $GeCl_4$ (germanium tetrachloride)). Dopants can be present in the glass either in the interstices of the glass (e.g. in the case of F) or they may be present as an oxide (e.g. in the case of Germanium, Aluminium, Phosphorus or Boron). Fluorine-doped silica means silica doped with fluorine dopant.

"precursor for a dopant" as used in the present description means: a compound or composition that, possibly after reaction with oxygen, when introduced or transformed into glass, becomes a dopant having an effect of the refractive index of the glass.

"non-vitrified silica" or "soot" as used in the present description and means: incompletely vitrified (=not or partly vitrified) silica. It can be either undoped or doped.

"vitrified silica" or "glass" as used in the present description means: a glassy substance produced by the vitrification of silica. It can be either undoped or doped. Undoped vitrified synthetic silica is also known as fused quartz or fused silica and has a high purity and consists mainly of amorphous $SiO_2$; it may comprise chlorine in an amount of up to 1500 ppm and still be considered to be undoped. Vitrified natural silica is prepared from natural silica particles or powder and comprises several impurities.

"reaction zone" as used in the present description means: the zone or axial location wherein glass-forming precursors, with or without precursors for a dopant, react and/or wherein a deposition takes place. This zone preferably moves reciprocally along the longitudinal length of an elongated tube or rod. An inner reaction zone is a reaction zone that effects deposition on the inside of a tube and an outer reaction zone is a reaction zone that effects deposition on the outside of a tube or rod. A plasma reaction zone is a reaction zone formed by a plasma. An outside deposition zone is a reaction zone for deposition on the outside of a tube or rod.

"intermediate layer" or intermediate cladding layer as used in the present description means: a layer of silica present in between the outer cladding and the inner optical cladding.

"reaction conditions" as used in the present description means: a set of conditions such as temperature, pressure, electromagnetic radiation (e.g. microwaves) that are used to effect the deposition of the silica layers (either non-vitrified or vitrified).

"plasma" as used in the present description means an electrical neutral medium of a (partly) ionized gas comprising positive ions and free electrons, wherein the ionization is induced by electromagnetic radiation (e.g. by microwaves).

"drying" or dehydrating as used in the present description means: removing OH-groups or H2O impurities from a deposited layer under influence of heat, possibly in a chlorine comprising environment.

"consolidating" as used in the present description means: sintering or fusing of a porous layer of non-vitrified silica or soot into a vitrified layer of silica under influence of heat.

"flame hydrolysis process" as used in the present description means: a chemical process (also called combustion chemical vapor deposition or CCVD by which a layer of material is deposited onto a substrate using a precursor compound that is added to the flame (e.g. from burning gas). The flame is moved closely above the surface to be coated and the energy within the flame converts the precursors into reactive intermediates, which react with oxygen and deposit on the substrate, forming an adhering layer of material.

"melting" as used in the present description means a process of heating silica particles. These particles are initially in a crystalline state and after melting they are in a vitreous state, and no longer identifiable as separate particles.

DETAILED DESCRIPTION

The method according to an aspect of the present teachings includes a step of preparing an intermediate layer of synthetic silica by the steps of deposition of (a plurality of) non-vitrified silica layers on the outside surface of the deposited tube/rod with a flame hydrolysis process using glass-forming precursors, and subsequently; drying and consolidating said non-vitrified silica layers into a vitrified fluorine-doped silica intermediate cladding layer. The presence of an intermediate layer further distances the outer cladding from the core leading to a decrease in attenuation.

A fluorine-comprising gas is used during the deposition and/or drying and/or consolidating of the intermediate layer. This will ensure a down-doping of the synthetic silica used to obtain a refractive index of said intermediate layer that is—upon drawing of the fiber approximately equal to or lower than the refractive index of the outer cladding. The absolute difference in refractive index between the intermediate cladding and the outer cladding is preferably between 0 and $2\times10^{-3}$, more preferably between 0 and $1\times10^{-3}$.

The preform may comprise the following layers, from the center to the periphery (as for example shown in FIG. 1 which is a cross section of a preform):
- an optical core 1, said optical core having an outer diameter (A)
- an inner optical cladding 2 directly surrounding the optical core; said inner optical cladding having an inner diameter that is the same as the outer diameter of the optical core (A) and having an outer diameter (B);
- an intermediate cladding layer 3 directly surrounding the inner optical cladding; said intermediate cladding layer having an inner diameter that is the same as the outer diameter of the inner optical cladding (B) and having an outer diameter (C); an overcladding layer 4 directly surrounding the intermediate cladding layer; said overcladding layer having an inner diameter that is the same as the outer diameter of the intermediate cladding (C) and having an outer diameter (D).

The ratio between the outer diameter of the intermediate cladding layer (C) to the outer diameter of the optical core (A), C/A is at least 3.5. This ratio ensures sufficient distance between the optical core and the outer cladding of natural silica and this will sufficiently reduce attenuation. In other words, the intermediate layer should have a certain thickness in order to ensure such a ratio. Preferably, the ratio of the outer diameter of the optical cladding (B) to the diameter of the core (A); B/A is at least 1.8.

The several methods steps will be discussed separately below.

Step i)

Step i) relates to deposition of non-vitrified silica layers on the inner surface of a hollow substrate tube by an inner plasma reaction zone having first reaction conditions which inner plasma reaction zone is created in the interior of said hollow substrate tube by means of electromagnetic radiation.

First a hollow substrate tube is provided with an inner surface on which deposition will take place. The substrate tube used according to the present invention may be a quartz substrate tube, e.g. a quartz tube of lower purity. It may also be a non-quartz substrate tube. The substrate tube should be able to withstand the temperatures that are used in the deposition process without melting or liquefying. Moreover, the substrate tube should be transparent to electromagnetic radiation to allow a plasma to be formed inside of said substrate tube when a plasma inner deposition method is used to prepare the inside deposition. The dimension of the substrate tube used in the present invention can be selected according to the requirements of the process equipment, the size of the preform and type of optical fiber to be formed. It may be required that the substrate tubes are subjected to a pre-treated process in order to make them more suitable for use in the plasma deposition equipment that is used in the present invention.

A gas flow is supplied into the interior of said substrate tube. In an embodiment, a gas flow is introduced via a supply side of said substrate tube, e.g. via a pipe line attached to said supply side; said gas flow comprising at least one glass-forming gas (e.g. silicon tetrachloride in combination with oxygen).

The removal of the substrate tube is facilitated by the presence of a layer of soot (non-vitrified silica) between the inner surface of said substrate tube and the deposited glass layers. This layer of soot (layers of non-vitrified silica) is sacrificed during this process. The soot layer is a fine, dust like material allowing the removal of the substrate tube.

This silica soot (non-vitrified silica layers) has a certain (albeit limited) adherence to the glass layers to be deposited and has a certain (albeit limited) adherence to the substrate tube. The soot acts as a barrier between two solid parts, firstly the substrate tube, and on the other hand the vitrified silica layers that are deposited in step ii). This barrier or sacrificial layer will act as a non-stick layer or buffer layer which allows the separation of the two vitrified silica layers on either side. The soot layer can be seen as a buffer layer between two tubes, on the outside the substrate tube and on the inside the deposited tube. The adherence of the soot layer to the substrate tube should on the one hand be sufficient to allow a layer to be formed (such as a continuous layer and/or a layer having substantially constant coverage of the inner surface of the substrate tube, and/or a layer having a substantially constant thickness over the length of the substrate tube). The adherence of the soot layer to the substrate tube should on the other hand be not too high in order to allow the subsequent separation of the substrate tube from said soot layer. The adherence of the soot layer to the vitrified silica layers to be deposited should on the one hand be sufficient to allow the vitrified silica layers to be formed. The adherence of the soot layer to the vitrified silica layers to be deposited should on the other hand be not too high in order to allow separation of the vitrified silica layers from the soot layer when removing the substrate tube so that the vitrified silica layers forming the deposited tube are not damaged during the removal of the substrate tube.

During step i) so-called first reaction conditions are applied. These first reaction conditions are effective for the production of non-vitrified silica layers, in other words these conditions are chosen to prevent deposition of vitrified silica. The first reaction conditions may entail the use of electromagnetic radiation to obtain a plasma (see PCVD section below). A gas flow of one or more glass-forming gasses is present during this step. In an embodiment a high pressure (relative to vacuum, e.g. >30 mbar, or >50 mbar) is maintained inside the substrate tube to prevent vitrification; pressure determines the amount of silica formation in the gas phase. If the pressure is higher than e.g. 30 mbar, there will be a significant amount of soot creation through the clustering of silica particles in the gas phase before deposition on the inner diameter of the substrate tube. The soot will stick to the inner surface of the substrate tube. When the plasma deposition process is carried out in a higher pressure regime (>50 mbar or even >60 mbar), the deposition is consisting of an even greater part of soot material.

In an embodiment the non-vitrified silica is supplied on a large part of the inner surface of the substrate tube, such as between the reversal point near the supply side and the reversal point near the discharge side. This allows optimal use of the substrate tube.

In an embodiment, the area of the inner surface that is to be covered by the vitrified silica layers is also covered previously by non-vitrified silica layers. This will facilitate the later removal of the substrate tube without damaging the vitrified silica layers, viz. the deposited layers.

In an embodiment, the non-vitrified silica is applied as a continuous layer. This will prevent any damage to the vitrified silica layers upon removal of the substrate tube.

In an embodiment, the non-vitrified silica is applied as a layer having a substantial constant thickness over the length of the substrate tube. This will ensure even deposition of the vitrified silica layers.

Step ii)

Step ii) relates to deposition of vitrified silica layers inside the hollow substrate tube on the inner surface of the non-vitrified silica layers deposited in step i) by an inner plasma reaction zone having second reaction conditions which inner plasma reaction zone is created in the interior of said hollow substrate tube by means of electromagnetic radiation for forming from the periphery to the center at least an inner optical cladding layer and an optical core layer.

Step ii) entails creating an inner plasma reaction zone having second reaction conditions different from the first reaction conditions in the interior of said hollow substrate tube. The substrate tube already comprises deposited non-vitrified glass layers on its inner surface. The second reaction conditions are created by means of electromagnetic radiation. During step ii) the deposition of vitrified silica layers on the non-vitrified silica layers deposited in a previous step is hence effected. The second reaction conditions should be suitable for the deposition of glass and are known in the field. It may entail the use of electromagnetic radiation to obtain a plasma (such as used in a PCVD process as described below).

At the end of this deposition step, a substrate tube having the desired number of doped or undoped vitrified silica layers deposited on its inner surface is obtained. At that moment, the deposition process is stopped. Thus, in case of a plasma deposition process, the electromagnetic radiation is stopped as well as the gas flow comprising glass-forming gases.

A gas flow is supplied into the interior of said hollow substrate tube. In an embodiment said gas flow is introduced via the supply side of said substrate tube; said gas flow comprising at least one glass-forming precursor (such as silicon tetrachloride in combination with oxygen). Optionally, said gas flow also comprises, during at least a part of the deposition, at least one precursor for a dopant, such as germanium (e.g. in the form of germanium tetra- or dichloride) and/or fluorine (e.g. in the form of a fluorine-comprising gas, such as $C_2F_6$).

During this step multiple layers of vitrified silica are formed. In an embodiment the successive layers of silica are doped or undoped and determine the refractive index profile of the optical fiber that will be made from the preform. For example a sequence of layers forms the optical cladding which may comprise a region with multiple layers of vitrified fluorine doped silica having a refractive index difference with undoped silica of between $-1 \times 10^{-3}$ and $-10 \times 10^{-3}$. A subsequent sequence of layers forms the optical core comprising a region of multiple layers of vitrified $GeO_2$ doped silica having a refractive index difference with undoped silica of between $3 \times 10^{-3}$ and $10 \times 10^{-3}$.

Within the capabilities of the PCVD process any sequence of vitrified silica layers having differing or gradually changing refractive index may be formed, including vitrified silica layers having more than one dopant, such a Fluorine and $GeO_2$ co-doped layers.

PCVD

PCVD is one or the processes that may be used to deposit non-vitrified silica layers during step i) and/or vitrified silica layers during step ii) of the process. This technique is used to deposit thin films from a gas state (vapour) to a solid state on a substrate, generally on the inside of a substrate tube. Chemical reactions are involved in the process, which occur after creation of a plasma of the reacting glass-forming gases that are introduced into the interior of the substrate tube. They may be added from one end (called the "supply side" of the substrate tube). Doped or undoped glass layers (depending on the use of reactive gases with or without one or more precursors to dopants, respectively) are deposited onto the interior surface of the substrate tube. The remaining gases are discharged or removed, e.g. from the other or opposite end of the substrate tube (called the "discharge side" of the substrate tube). The remaining gases (unreacted starting gases and reaction products) are e.g. removed by means of a vacuum pump; having the effect of generating a reduced pressure (e.g. between 5 and 50 mbar) in the interior of the substrate tube.

In an embodiment, the plasma is induced by the use of electromagnetic radiation (e.g. microwaves) that may be generated in a generator and being directed towards an applicator via a waveguide. The applicator surrounds preferably a part of the substrate tube. The plasma reaction zone is the three dimensional space that is taken up by the plasma inside of the substrate tube. The applicator couples the electromagnetic energy into a plasma that is generated inside the substrate tube. The applicator may be moved reciprocally in the longitudinal direction of the substrate tube; the plasma formed (called the "inner plasma reaction zone") is then also moved reciprocally. As a result of this movement a thin silica layer is deposited onto the interior of the substrate tube with every stroke or pass. Depending on the reaction conditions, this layer can be non-vitrified silica or vitrified silica. The applicator and the substrate tube may be surrounded by a furnace so as to maintain the substrate tube at a temperature of between 900° C. and 1300° C. during the plasma deposition process.

The applicator may be moved in translation over the length of the substrate tube within the boundaries of a furnace which surrounds the substrate tube and the applicator reciprocating within the furnace; the plasma having the same translational movement. In this embodiment, as the applicator reaches the inner wall of the furnace near one end of the substrate tube, the movement of the applicator is reversed so that it moves to the other end of the substrate tube towards the other inner wall of the furnace. The applicator and thus the plasma travels a back and forth movement along the length of the substrate tube. Each back and forth movement is called a "pass" or "stroke". With each pass a thin layer of silica material is deposited on the inside of the substrate tube.

Plasma causes the chemical reaction of the glass-forming gases (e.g. $O_2$, $SiCl_4$ and e.g. a precursor for a dopant, such as $GeCl_4$ or other gases) that are supplied to the inside of the substrate tube. The chemical reaction of the glass-forming gases allows reaction of Si (Silicon), O (Oxygen) and e.g. the dopant Ge (Germanium) so as to thus effect direct deposition of, for example, Ge-doped SiOx on the inner surface of the substrate tube. Only at the position of the plasma, the reactive gasses are converted into solid glass and deposited on the inside surface of the substrate tube.

A plasma may be generated only in a part of the substrate tube, viz. the part that is surrounded by the applicator.

When the number of passes increases the cumulative thickness of these thin films, i.e. of the deposited material, increases; thus leading to a decrease in the remaining internal diameter of the substrate tube. In other words, the hollow space inside the substrate tube keeps getting smaller with each pass.

Step iii)

Step iii) relates to removal of the substrate tube.

The substrate tube is removed from the vitrified silica layers deposited in step ii) and the non-vitrified silica layers deposited in step i). After this step a deposited tube is obtained.

After the vitrified silica layers have been deposited in step ii) onto the interior of the substrate tube (on top of the already present non-vitrified layers deposited in step i)), the substrate tube is removed. The substrate tube may be considered as a temporary substrate tube in the sense that the substrate tube will not form part of the material making up the preform. The substrate tube can be regarded as a hollow mandrel that is removed after its task has been carried out.

The removal of the substrate tube may be a mechanical removal. Mechanical removal can be carried out by hand or in a machine. There are several ways in which the substrate tube can be removed. In a first aspect, the substrate tube will remain intact after removal. In a second aspect, the substrate tube will not remain intact after removal.

For example, near both longitudinal ends of the substrate tube a circular (radial) cut is made, preferably through the thickness of the substrate tube, optionally extending into the soot layer. After this radial cut, the substrate tube is in principle coaxially present in a non-connected (loose) manner around the deposited glass layers. The soot layer is brittle and by rotating or forced sliding of the "loose" substrate tube, this soot layer can be broken or shattered to provide movement between the substrate tube and the glass layers. It should however be noted that this movement is very limited in nature since the limited spacing between the substrate tube and the glass layer is filled with the (broken or shattered) soot layer. The soot layer may also be first removed.

In an embodiment, the non-vitrified silica layers are removed (sacrificed) by the use of a liquid, e.g. water or another aqueous solution prior to removal of the substrate tube. The brittle particulate of non-vitrified silica is broken so that a fine, dust like material dispersed in the liquid is obtained, which can be removed by removing the liquid. This will then free a spacing between the substrate tube and vitrified silica layers allowing sliding the substrate tube off of the deposited tube formed by the vitrified silica layers. After removal of the liquid and the particulate a hollow space is obtained between the two coaxial tubes facilitating the removal of the outer, substrate tube.

According to the first aspect, an embodiment is as follows. Firstly, radial cuts are made near both longitudinal ends as discussed above. Following, one (or both) ends of the substrate tube are removed (e.g. by making a deeper radial cut that goes through the complete substrate tube and deposited tube) so that the substrate tube can be slid off the deposited glass layer inside of it. This allows the substrate tube to be reused for another deposition process. In an embodiment the total thickness of the non-vitrified layers (soot layers) is between 200 and 1000 micrometers, having e.g. between 100 and 500 layers of non-vitrified silica. This allows sufficient distance between the two coaxial tubes (viz., the outer substrate tube and the inner deposited tube) for removal to be effected.

For the second aspect, wherein the substrate tube is not remained intact, several, non-limiting, embodiments are making longitudinal cuts and removing or shattering the substrate tube by hand operated hammer and chisel.

In an embodiment, the substrate tube can be subjected to one or more (e.g. two opposite) longitudinal cuts (e.g. by a machine operated saw blade). These longitudinal cuts (or cut) are for example over the full length of the substrate tube. These cuts (or cut) are preferably through the thickness of the substrate tube, optionally extending into the soot layer. After these cuts (or cut) are made, two halves (or more portions) of the substrate tube can be removed. This does not allow for the reuse of the substrate tube.

In another embodiment, the substrate tube can be subjected to a hand operated hammer and chisel to form a crack (or more cracks). These cracks might progress in a longitudinal direction. This will shatter the substrate tube which is removed in a plurality of parts. This does not allow for the reuse of the substrate tube.

In another embodiment, the substrate tube is provided with one more longitudinal or helical grooves made with a glass worker's diamond knife, followed by shattering of the substrate tube. This could be either by either machine or hand operation. This does not allow for the reuse of the substrate tube.

In order to reduce the manufacture time and cost, in this case a total thickness of the non-vitrified layers is preferably between 1 and 100 micrometers, more preferably maximally 40 micrometers, even more preferably maximally 20 micrometer. The number of non-vitrified silica layers is preferably between 1 and 50, more preferably maximally 20, even more preferably maximally 10.

In a further aspect for these embodiments, the ends of the substrate tube (weld ends) can be maintained in place. This allows easy transfer of the deposited tube (after removal of the substrate tube) to a next step in the process, e.g. a collapsing apparatus or a plasma deposition apparatus. In this case the step of radial cutting near both longitudinal ends can be carried out as a first step in the removal of the substrate tube.

Step iv)

Step iv) relates to collapsing said deposited tube obtained in step iii) to obtain a deposited rod comprising from the periphery to the center at least one inner optical cladding and an optical core. This step is optional at this point in the process.

The deposited tube obtained after the removal of the substrate tube may be subsequently contracted by heating into a solid rod ("collapsing") or deposited rod.

For collapsing, the deposited tube may be mounted on a lathe, e.g. by fastening both ends of the deposited tube by clamps. The deposited tube may be locally heated (e.g. by a hot zone of a reciprocating furnace or burners) until a sufficiently high temperature is reached to soften the glass. When the glass starts to soften it assumes a smaller diameter and closes the central cavity. This process is, in an aspect, carried out until the deposited tube is completely closed, viz. until the cavity is no longer present; several strokes may be carried out to achieve this. The temperature during collapsing may be at least 1700° C., such as at least 1800° C., or at least 1900° C.

The deposited tube may be subjected to a collapsing treatment so as to form a solid rod (step iv) is carried out). However, it can be envisaged that only after deposition of the intermediate layer the collapsing step is carried out (step iv) is not carried out).

Step v)

Step v) relates to preparation of an intermediate layer.

In an embodiment, the step of adding the intermediate layer is carried out directly on the deposited tube after removal of the substrate tube or on the deposited rod obtained from collapsing the deposited tube; no sleeving is applied on the deposited tube or rod.

The solid rod obtained after this step may be regarded as a primary preform.

The intermediate layer is preferably obtained by an outside vapor deposition (OVD) process. During this process non-vitrified silica layers are deposited which are subsequently consolidated (vitrified). During this step synthetic silica is deposited. Vitrified synthetic silica is also known as fused quartz or fused silica and has a high purity and consists mainly of amorphous $SiO_2$. The refractive index of vitrified synthetic silica may be 1.4585 at 632.8 nm. Synthetic silica is also called pure silica, even though e.g. chlorine contamination may be present. Synthetic silica may be prepared by using high-purity starting materials such as gaseous silicon precursors, e.g. tetra silicon halides $SiX_4$ wherein X is a halide, (e.g. $SiCl_4$), or a siloxane precursor, e.g. a cyclomethicone (cyclopolydimethylsiloxane) having the formula $[(CH_3)_2SiO]_y$, (e.g. octamethylcyclotetrasiloxane wherein y is 4, also known as OMCTS or D4). Compounds having the formula $[(CH_3)_2SiO]_y$, wherein y is 5 or 6 may also be used. Preferred precursors for synthetic silica used during this step are $SiCl_4$ and D4.

This step may comprise several sub steps which are discussed in more detail below.

Sub Step a):
deposition of non-vitrified silica layers on the outside surface of the deposited tube obtained in step iii) or deposited rod obtained in step iv) with a flame hydrolysis process in an outer reaction zone using glass-forming precursors.

Preferably, the deposition of a non-vitrified intermediate layer is realized by a flame hydrolysis process of silica based soot over the deposited tube or deposited rod. In an embodiment the tube or rod is mounted on an OVD horizontal lathe and silica soot is deposited on the outside of a rotating tube or rod acting as a target in a standard OVD process.

Flame hydrolysis deposition of silica yields porous (non-vitrified) glass or soot. A vapor feed burner may be used in which precursors, e.g. $SiCl_4$ or OMCTS are added in gas form into a burner flame to produce oxide-soot particles which particles are deposited on the surface of a substrate. The gas stream provides the vapors of at least one material that will hydrolyze to form an oxide in the flame of a combustion burner.

In an embodiment, the glass-forming precursors that are used are gaseous silicon precursors.

In an embodiment, the gaseous silicon precursors are a tetra silicon halide or a cyclopolydimethylsiloxane having the formula $[(CH_3)_2SiO]_y$, wherein y is 4, 5, or 6.

In an embodiment, the gaseous silicon precursors are $SiCl_4$ or octamethylcyclotetrasiloxane (OMCTS). OMCTS is a chloride-free precursor that is environmentally friendly. OMCTS can be supplied to the lathe in a liquid form and converted in vapour form in a vaporizer using nitrogen as a carrier.

In an embodiment, a fluorine-comprising gas is used during the deposition of the non-vitrified silica layers deposited in step v) in order to obtain fluorine-doped non-vitrified silica layers. In an embodiment, said fluorine-comprising gas is selected from the group consisting of $SiF_4$, $SF_6$, $CF_4$, and $C_2F_6$, preferably $SF_6$ and $C_2F_6$.

Sub Step b):
drying and consolidating of said non-vitrified silica layers into a vitrified fluorine-doped silica intermediate cladding layer.

The drying and consolidation of the non-vitrified silica layers may be carried out by placing the deposited tube/rod having the non-vitrified silica layers on the outside surface thereof in a heated environment, e.g. a furnace, with a first zone having a temperature of e.g. above 900° C., e.g. above 1000° C., such as between 1000 and 1300° C. and a second, preferably contiguous, zone having a temperature of e.g. above 1400° C., or above 1500° C., for example between 1500 and 1650° C.

The furnace may be supplied with helium at a flow rate from 10 to 20 l/min, thus resulting in a helium atmosphere inside.

The (entire) deposited tube or deposited rod (comprising the non-vitrified glass layers at its outer surface) is maintained in the first zone for a first drying time which may be between 60 and 180 minutes, e.g. between 100 and 140 minutes.

In an embodiment, a fluorine-comprising gas is used during the drying of the non-vitrified silica layers deposited in step v); in other words simultaneous drying and doping. In an embodiment, said fluorine-comprising gas is selected from the group consisting of $SiF_4$, $SF_6$, $CF_4$, and $C_2F_6$, preferably $SF_6$ and $C_2F_6$.

In an embodiment, simultaneously drying and doping with fluorine of the non-vitrified glass layers takes place by heating the entire deposited tube or deposited rod (comprising the non-vitrified glass layers at its outer surface) at a temperature of from 1000° C. to 1350° C. and by exposing it to an atmosphere (preferably helium atmosphere) containing a chlorine-comprising gas and a fluorine-comprising gas, the content of the fluorine-comprising gas in the atmosphere preferably being from 0.01% to 0.50% by volume and the content of the chlorine-comprising gas in the atmosphere is preferably between 2% and 10% by volume.

In an embodiment, the content of the chlorine-comprising gas in the atmosphere is between 2% and 10% by volume. In an embodiment, the content of the fluorine-comprising gas in the atmosphere is from 0.01% to 0.50% by volume. In an embodiment, the atmosphere is a helium atmosphere.

The consolidating of the non-vitrified silica layers may be carried out by moving the deposited tube/rod having the dried non-vitrified silica layers on the outside surface thereof into the second zone at a rate of from 5 mm/min to 10 mm/min until all the parts of the tube/rod (comprising the non-vitrified glass layers as its outer surface) have experienced a heated environment having a temperature of e.g. above 1400° C., e.g. above 1500° C., such as between 1500 and 1650° C.

In an embodiment, chlorine-comprising gas is maintained during the consolidation of the non-vitrified layers in step v), in other words simultaneous consolidation and further drying.

The consolidation time may be between 100 and 400 minutes, e.g. between 200 and 300 minutes.

The level of fluorine doping that is optimal depends on the tension with which the optical fiber will be drawn from the preform. In an embodiment, the F-doping of the intermediate layer will be at least 1100 ppm when optical fibers are being drawn with a drawing tension of 80 grams, 1800 ppm is required for a drawing tension of 140 grams, and 2400 ppm is required for a drawing tension of 190 grams. If the fluorine doping is too low then an intermediate ring with a positive index will appear in the refractive index profile that will dramatically increase bending losses at longer wavelengths making the fibre very sensitive for bending and less suitable for use.

Sub Step c):
in case preceding step iv) was omitted collapsing.

When a deposited tube instead of a deposited rod is used for the addition of an intermediate layer, a collapsing step needs to be carried out at this stage of the procedure. This may be a separate collapsing step as disclosed above, or alternatively a collapsing of the rod that takes place during consolidation.

The result of this process step v) is to provide a solid rod comprising from the periphery to the center the intermediate layer, at least one inner optical cladding and an optical core.

The solid rod obtained has a certain amount of fluorine-doping that is obtained by the use of a fluorine-comprising gas during the deposition and/or drying and/or consolidating.

The intermediate layer has a ratio between the outer diameter of the intermediate cladding layer (C) to the outer diameter of the optical core (A) that is at least 3.5. With a C/A ratio of 3.5 natural silica having up to 0.1 ppm of iron can be used without noticeable increase of attenuation at 1550 nm.

In an embodiment, the intermediate layer has a ratio between the outer diameter of the intermediate cladding layer (C) to the outer diameter of the optical core (A) that is at least 4.0. With a C/A ratio of 4.0 natural silica with up to 0.3 ppm iron and 10 ppm OH may be used without noticeable increase of attenuation at 1550 nm.

In an embodiment, the intermediate layer has a ratio between the outer diameter of the intermediate cladding layer (C) to the outer diameter of the optical core (A) that is at least 4.0. With a C/A ratio of 4.2 natural silica with up to 0.5 ppm of iron can be used without noticeable increase of attenuation at 1550 nm.

It should be noted that the ratio between C/A as in the preform corresponds to the ratio between C/A in the optical fiber drawn therefrom.

The ratio between B/A is preferably between 1.8 and 3.0. It should be noted that the ratio between B/A as in the preform corresponds to the ratio between B/A in the optical fiber drawn therefrom.

The thickness of the intermediate layer in the resulting optical fiber is preferably between 10 and 20 micrometer.

Step vi)

Step vi) relates to deposition of natural silica on the outside surface of the intermediate cladding layer of the solid rod obtained in step v). This deposition takes place by melting natural silica particles or grains in an outer deposition zone to produce an outer cladding whereby a preform is obtained.

The outer cladding is applied by deposition of natural silica on the outside surface of the intermediate cladding layer by melting fine natural silica particles. The solid rod is furthermore externally provided with an additional amount of glass, for example by means of an external vapour deposition process or direct glass overcladding (so-called "overcladding") thus obtaining a composite preform called the final preform. From the final preform thus produced, one end of which is heated, optical fibres are obtained by drawing on a drawing tower. The refractive index profile of the consolidated (final) preform corresponds to the refractive index profile of the optical fibre drawn from such a preform.

Overcladding may be carried out using a so-called APVD process or axial (external) plasma vapor deposition wherein grains of natural silica are deposited by gravity from a feed pipe which is moved in translation parallel to the solid rod wherein the silica grains are fused and then vitrified at a temperature of e.g. 2300° C., by means of an atmospheric plasma flame.

The melting of the silica particles that occurs during the APVD process may take place at a melting temperature at which the natural silica is transformed from a crystalline state into an amorphous state. The melting temperature may be above 1800° C., such as above 2000° C. The melting temperature may be below 2500° C., such as below 2200° C. In an embodiment, the melting temperature is between 1800° C. and 2200° C. After melting the resulting solid rod may be cooled to a temperature of below 300° C. so that a silica layer ($SiO_2$) is formed. Melting may be carried out by using a plasma flame or torch. The duration of melting is between 12 and 24 hours. The flow of natural silica during the process is between 30 and 150 g/min.

In an embodiment, fine natural silica particles, such as silica powder, are used during the final step of overcladding. With "fine" is meant a median particle size of the powder of below 400 micron, preferably below 200 micron.

Natural silica particles may be used as a material for overcladding. However, natural silica contains impurities (e.g. hydroxyl groups or Fe). A typical residue contamination of the natural silica used to manufacture an optical fiber—although the present invention is not limited to the use of natural silica having these values—is: between 5 and 25 ppm of aluminium (Al), between 0.1 and 0.7 ppm lithium (Li), between 0 and 0.5 ppm iron (Fe), between 0 and 0.5 ppm potassium (K), between 0 and 0.5 ppm sodium (Na), between 0 and 1 ppm calcium (Ca), between 1 and 2 ppm titanium (Ti).

In an aspect, a preform obtained by or obtainable by the method above is provided.

In an embodiment, the outer diameter of the optical core of an optical fiber drawn from such preform is between 8 and 10 micrometer. In an embodiment, the outer diameter of the optical core is 8.5 micrometer.

In an embodiment, the outer diameter of the inner optical cladding of an optical fiber drawn from such preform is between 16 and 24 micrometer. In an embodiment, this outer diameter of the inner optical cladding is between 19 and 21 micrometer. In an embodiment, this outer diameter of the inner optical cladding is 20 micrometer.

In an embodiment, the outer diameter of the intermediate layer of an optical fiber drawn from such preform is between 28 and 40 micrometer. In an embodiment, this outer diameter of the intermediate layer is between 32 and 36 micrometer. In an embodiment, this outer diameter of the intermediate layer is 34 micrometer.

In an embodiment, the outer cladding of an optical fiber drawn from such preform has a diameter of between 100 and 150 micrometer. In an embodiment, this outer cladding has a diameter of between 115 and 135 micrometer. In an embodiment, this outer cladding has a diameter of 125 micrometer.

In an aspect, there is provided an optical fiber obtained by a process of drawing the preform above. In an embodiment, said optical fiber is a single mode optical fiber.

The final preform prepared using the method according to the present invention may be used to draw optical fibers.

From the final preform thus produced, one end of which is heated, optical fibres are obtained by drawing on a drawing tower. The refractive index profile of the consolidated (collapsed) preform corresponds to the refractive index profile of the optical fibre drawn from such a preform.

The present teaching does not require significant changes to the instrumental setup or apparatus that is already in use.

Clauses

The following clauses define several aspects and embodiments of the teaching herein.

1. A method for manufacturing a preform for optical fibers, which method comprises the (sequential) steps of:
   i) deposition of non-vitrified silica layers on the inner surface of a hollow substrate tube by an inner plasma reaction zone having first reaction conditions which inner plasma reaction zone is created in the interior of said hollow substrate tube by means of electromagnetic radiation;

ii) deposition of vitrified silica layers inside the hollow substrate tube on the inner surface of the non-vitrified silica layers deposited in step i) by a inner plasma reaction zone having second reaction conditions which inner plasma reaction zone is created in the interior of said hollow substrate tube by means of electromagnetic radiation for forming from the periphery to the center at least an inner optical cladding layer and an optical core layer;

iii) removal of the hollow substrate tube from the vitrified silica layers deposited in step ii) and the non-vitrified silica layers deposited in step i) to obtain a deposited tube;

iv) optional collapsing said deposited tube obtained in step iii) to obtain a deposited rod comprising from the periphery to the center at least one inner optical cladding and an optical core;

v) preparation of an intermediate layer by the steps of:
deposition of non-vitrified silica layers on the outside surface of the deposited tube obtained in step iii) or deposited rod obtained in step iv) with a flame hydrolysis process in an outer reaction zone using glass-forming precursors, and subsequently;
drying and consolidating said non-vitrified silica layers into a vitrified fluorine-doped silica intermediate cladding layer; and
in case preceding step iv) was omitted collapsing;
to provide a solid rod comprising from the periphery to the center the intermediate layer, at least one inner optical cladding and an optical core; wherein a fluorine-comprising gas is used during the deposition and/or drying and/or consolidating and wherein the intermediate layer has a ratio between the outer diameter of the intermediate cladding layer (C) to the outer diameter of the optical core (A) that is at least 3.5;

vi) deposition of natural silica on the outside surface of the intermediate cladding layer of the solid rod obtained in step v) by melting natural silica particles in an outer deposition zone to produce an outer cladding whereby a preform is obtained.

2. The method according to clause 1, wherein said intermediate layer is doped with at least 1100 ppm of fluorine.

3. The method according to clause 1, wherein said intermediate layer is doped with at least 1800 ppm fluorine.

4. The method according to clause 1, wherein said intermediate layer is doped with at least 2400 ppm fluorine.

5. The method according to clause 1, wherein said fluorine-comprising gas is used during the consolidation of the non-vitrified layers in step v).

6. The method according to clause 1, wherein said fluorine-comprising gas is selected from the group consisting of $SiF_4$, $SF_6$, $CF_4$, and $C_2F_6$.

7. The method according to clause 1, wherein said fluorine-comprising gas is $SF_6$.

8. The method according to clause 1, wherein said fluorine-comprising gas is $O_2F_6$.

9. The method according to clause 1, wherein the C/A ratio is at least 4.0.

10. The method according to clause 1, wherein the C/A ratio is at least 4.2.

11. The method according to clause 1, wherein the glass-forming precursors that are used in step v) are gaseous silicon precursors.

12. The method according to clause 1, wherein the glass-forming precursor that is used in step v) is a tetra silicon halide.

13. The method according to clause 1, wherein the glass-forming precursor that is used in step v) is a cyclopolydimethylsiloxane having the formula $[(CH_3)_2SiO]_y$ wherein y is 4, 5, or 6.

14. The method according to clause 1, wherein the glass-forming precursor that is used in step v) is $SiCl_4$.

15. The method according to clause 1, wherein the glass-forming precursor that is used in step v) is octamethylcyclotetrasiloxane (OMCTS).

16. The method according to clause 1, wherein step ii) comprises depositing one or more layers of vitrified fluorine doped silica having a refractive index difference with undoped silica between $-1 \times 10^{-3}$ and $-10 \times 10^{-3}$.

17. The method according to clause 1, wherein a plasma flame is used for the deposition of natural silica in step vi).

18. The method according to according to clause 1, wherein a fluorine-comprising gas is used during the drying of the non-vitrified silica layers deposited in step v).

19. The method according to clause 18, wherein simultaneously drying and doping with fluorine of the non-vitrified glass layers takes place by heating the entire deposited tube or deposited rod (comprising the non-vitrified glass layers at its outer surface) at a temperature of from 1000° C. to 1350° C. and by exposing it to an atmosphere containing a chlorine-comprising gas and a fluorine-comprising gas, the content of the fluorine-comprising gas in the atmosphere being of from 0.01% to 0.50% by volume.

20. The method according to clause 19, wherein, the simultaneously drying and doping with fluorine of the non-vitrified glass layers is followed by consolidating of the non-vitrified glass layers at a consolidation temperature of from 1500° C. to 1650° C.

21. A preform obtained by or obtainable by the method according to any one of the preceding clauses.

22. An optical fiber obtained by a process of drawing the preform according to clause 21.

23. A single mode optical fiber obtained by a process of drawing the preform according to clause 21.

24. The optical fiber according to clause 22 or 23, wherein the outer diameter of the optical core is between 8 and 10 micrometer.

25. The optical fiber according to clause 22 or 23, wherein the outer diameter of the optical core is 8.5 micrometer.

26. The optical fiber according to clause 22 or 23, wherein the outer diameter of the inner optical cladding is between 16 and 24 micrometer.

27. The optical fiber according to clause 22 or 23, wherein the outer diameter of the inner optical cladding is between 19 and 21 micrometer.

28. The optical fiber according to clause 22 or 23, wherein the outer diameter of the inner optical cladding is such as 20 micrometer.

29. The optical fiber according to clause 22 or 23, wherein the outer diameter of the intermediate layer is between 28 and 40 micrometer.

30. The optical fiber according to clause 22 or 23, wherein the outer diameter of the intermediate layer is between 32 and 36 micrometer.

32. The optical fiber according to clause 22 or 23, wherein the outer diameter of the intermediate layer is 34 micrometer.

33. The optical fiber according to according to clause 22 or 23, wherein the outer cladding has a diameter of between 100 and 150 micrometer.

34. The optical fiber according to according to clause 22 or 23, wherein the outer cladding has a diameter of between 115 and 135 micrometer.

35. The optical fiber according to according to clause 22 or 23, wherein the outer cladding has a diameter of 125 micrometer.

36. A method for manufacturing a preform for optical fibers, which method comprises the addition of an intermediate layer to the outside surface of a deposited tube or rod by deposition of non-vitrified silica layers using flame hydrolysis of glass-forming precursors, and drying and consolidating said natural silica is deposited on the outside surface of the intermediate cladding layer by melting of natural silica particles.

37. A method according to clause 36, wherein a fluorine-comprising gas is used during the deposition and/or drying and/or consolidating and wherein the intermediate layer has a ratio between the outer diameter of the intermediate cladding layer (C) to the outer diameter of the optical core (A) that is at least 3.5.

38. A method for manufacturing a preform for optical fibers, which method comprises the sequential steps of:
  i) deposition of non-vitrified silica layers on the inner surface of a hollow substrate tube by an inner plasma reaction zone having first reaction conditions which inner plasma reaction zone is created in the interior of said hollow substrate tube by means of electromagnetic radiation;
  ii) deposition of vitrified silica layers inside the hollow substrate tube on the inner surface of the non-vitrified silica layers deposited in step i) by an inner plasma reaction zone having second reaction conditions which inner plasma reaction zone is created in the interior of said hollow substrate tube by means of electromagnetic radiation for forming from the periphery to the center at least an inner optical cladding layer and an optical core layer;
  iii) removal of the hollow substrate tube from the vitrified silica layers deposited in step ii) and the non-vitrified silica layers deposited in step i) to obtain a deposited tube;
  iv) collapsing said deposited tube obtained in step iii) to obtain a deposited rod comprising from the periphery to the center at least one inner optical cladding and an optical core;
  v) preparation of an intermediate layer by the steps of: *deposition of non-vitrified silica layers on the outside surface of deposited rod obtained in step iv) with a flame hydrolysis process in an outer reaction zone using glass-forming precursors, and subsequently; *drying and consolidating said non-vitrified silica layers into a vitrified fluorine-doped silica intermediate cladding layer; to provide a solid rod comprising from the periphery to the center the intermediate layer, at least one inner optical cladding and an optical core; wherein a fluorine-comprising gas is used during the deposition and/or drying and/or consolidating and wherein the intermediate layer has a ratio between the outer diameter of the intermediate cladding layer (C) to the outer diameter of the optical core (A) that is at least 3.5;
  vi) deposition of natural silica on the outside surface of the intermediate cladding layer of the solid rod obtained in step v) by melting natural silica particles in an outer deposition zone to produce an outer cladding whereby a preform is obtained.

39. A method for manufacturing a preform for optical fibers, which method comprises the sequential steps of:
  a) deposition of non-vitrified silica layers on the inner surface of a hollow substrate tube by an inner plasma reaction zone having first reaction conditions which inner plasma reaction zone is created in the interior of said hollow substrate tube by means of electromagnetic radiation;
  b) deposition of vitrified silica layers inside the hollow substrate tube on the inner surface of the non-vitrified silica layers deposited in step a) by a inner plasma reaction zone having second reaction conditions which inner plasma reaction zone is created in the interior of said hollow substrate tube by means of electromagnetic radiation for forming from the periphery to the center at least an inner optical cladding layer and an optical core layer;
  c) removal of the hollow substrate tube from the vitrified silica layers deposited in step b) and the non-vitrified silica layers deposited in step a) to obtain a deposited tube;
  d) preparation of an intermediate layer by the steps of: *deposition of non-vitrified silica layers on the outside surface of the deposited tube obtained in step iii) or deposited rod obtained in step iv) with a flame hydrolysis process in an outer reaction zone using glass-forming precursors, and subsequently; *drying and consolidating said non-vitrified silica layers into a vitrified fluorine-doped silica intermediate cladding layer; and *collapsing; to provide a solid rod comprising from the periphery to the center the intermediate layer, at least one inner optical cladding and an optical core; wherein a fluorine-comprising gas is used during the deposition and/or drying and/or consolidating and wherein the intermediate layer has a ratio between the outer diameter of the intermediate cladding layer (C) to the outer diameter of the optical core (A) that is at least 3.5;
  e) deposition of natural silica on the outside surface of the intermediate cladding layer of the solid rod obtained in step d) by melting natural silica particles in an outer deposition zone to produce an outer cladding whereby a preform is obtained.

40. A method for manufacturing a preform for optical fibers, which method comprises the sequential steps of: i) deposition of non-vitrified silica layers on the inner surface of a hollow substrate tube; ii) deposition of vitrified silica layers inside the hollow substrate tube on the inner surface of the non-vitrified silica layers deposited in step i); iii) removal of the hollow substrate tube from the vitrified silica layers deposited in step ii) and the non-vitrified silica layers deposited in step i) to obtain a deposited tube; iv) optional collapsing said deposited tube obtained in step iii) to obtain a deposited rod comprising from the periphery to the center at least one inner optical cladding and an optical core; v) preparation of an intermediate layer by the steps of: *deposition of non-vitrified silica layers on the outside surface of the deposited tube obtained in step iii) or deposited rod obtained in step iv) with a flame hydrolysis process in an outer reaction zone using glass-forming precursors, and subsequently; *drying and consolidating said non-vitrified silica layers into a vitrified fluorine-doped silica intermediate cladding layer; and *in case preceding step iv) was omitted collapsing; to provide a solid rod comprising from the periphery to the center the intermediate layer, at least one inner optical cladding and an optical core; wherein a fluorine-comprising gas is used during the deposition and/or drying and/or consolidating and wherein the intermediate layer has a ratio between the outer diameter of the intermediate cladding layer (C) to the outer diameter of the optical core (A) that is at least 3.5; vi) deposition of natural silica on the outside surface of the intermediate cladding layer of the solid rod obtained in step v) by melting natural silica particles in an outer deposition zone to produce an outer cladding whereby a preform is obtained.

The invention claimed is:

1. A method for manufacturing a preform for optical fibers, comprising the sequential steps of:
   i) depositing inner non-vitrified silica layers on the inner surface of a hollow substrate tube by a first inner plasma reaction zone having first reaction conditions, wherein the first inner plasma reaction zone is created in the interior of the hollow substrate tube by means of electromagnetic radiation;
   ii) depositing vitrified silica layers inside the hollow substrate tube on the inner surface of the inner non-vitrified silica layers deposited in step i) by a second inner plasma reaction zone having second reaction conditions, wherein the second inner plasma reaction zone is created in the interior of the hollow substrate tube by means of electromagnetic radiation and wherein the vitrified silica layers comprise at least an inner optical cladding layer and an optical core layer;
   iii) removing the hollow substrate tube from the vitrified silica layers deposited in step ii) to obtain a deposited tube;
   iv) optionally collapsing the deposited tube obtained in step iii) to obtain a deposited rod comprising from its periphery to its center at least one inner optical cladding layer and an optical core;
   v) preparing an intermediate cladding layer by the steps of:
      depositing outer non-vitrified silica layers on the outside surface of the deposited tube obtained in step iii) or the deposited rod obtained in step iv) with a flame hydrolysis process in an outer reaction zone using one or more glass-forming precursors, and subsequently;
      drying and consolidating the outer non-vitrified silica layers into a vitrified fluorine-doped silica intermediate cladding layer; and
      in case preceding step iv) was omitted, collapsing the deposited tube with the vitrified intermediate cladding layer;
   to provide a solid rod comprising from its periphery to its center an intermediate cladding layer, at least one inner optical cladding layer, and an optical core; wherein a fluorine-comprising gas is used during depositing and/or drying and/or consolidating and wherein the ratio between the outer diameter of the intermediate cladding layer (C), which is formed via outside deposition, and the outer diameter of the optical core (A), which is formed via inside deposition, is at least 3.5; and
   vi) depositing natural silica on an outside surface of the intermediate cladding layer of the solid rod obtained in step v) by melting natural silica particles in an outer deposition zone to produce an outer cladding whereby a preform is obtained, wherein particles of natural silica having iron impurities of more than 0 ppm iron and less than 0.5 ppm iron are deposited by gravity at a rate between 30 g/min and 150 g/min from a feed pipe moving in translation parallel to the solid rod;
   wherein step ii) comprises depositing one or more layers of vitrified fluorine-doped silica having a refractive index difference with undoped silica of between $-1 \times 10^{-3}$ and $-10 \times 10^{-3}$ to form at least one inner optical cladding layer; and
   wherein the absolute difference in refractive index between the preform's intermediate cladding layer and the preform's outer cladding is between 0 and $1 \times 10^{-3}$.

2. The method according to claim 1, wherein the intermediate cladding layer is doped with at least 1100 ppm of fluorine.

3. The method according to claim 1, wherein the fluorine-comprising gas is used while consolidating the outer non-vitrified layers in step v) and/or wherein the fluorine-comprising gas is selected from the group consisting of $SiF_4$, $SF_6$, $CF_4$, and $C_2F_6$.

4. The method according to claim 1, wherein the C/A ratio is at least 4.0.

5. The method according to claim 1, wherein the one or more glass-forming precursors used in step v) are gaseous silicon precursors.

6. The method according to claim 1, wherein a plasma flame is used to deposit natural silica in step vi).

7. The method according to claim 1, wherein the fluorine-comprising gas is used during the drying of the outer non-vitrified silica layers deposited in step v).

8. The method according to claim 7, wherein preparing an intermediate cladding layer in step v) comprises simultaneously drying and doping with fluorine of the outer non-vitrified glass layers by heating the entire deposited tube or deposited rod to a temperature between 1000° C. and 1350° C. and by exposing the deposited tube or deposited rod to an atmosphere containing the fluorine-comprising gas and a chlorine-comprising gas, the content of the fluorine-comprising gas in the atmosphere being 0.01% to 0.50% by volume.

9. The method according to claim 8, wherein the simultaneously drying and doping with fluorine the outer non-vitrified glass layers is followed by consolidating the outer non-vitrified glass layers at a consolidation temperature of 1500° C. to 1650° C.

10. The method according to claim 1, comprising drawing the preform to obtain an optical fiber having an optical core, an inner optical cladding, an intermediate cladding, and an outer cladding.

11. The method according to claim 10, wherein the outer diameter of the optical fiber's optical core is between 8 and 10 micrometers.

12. The method according to claim 10, wherein the outer diameter of the optical fiber's inner optical cladding is between 16 and 24 micrometers.

13. The method according to claim 10, wherein the outer diameter of the optical fiber's intermediate cladding layer is between 28 and 40 micrometers.

14. The method according to claim 10, wherein the optical fiber's outer cladding has a diameter of between 100 and 150 micrometers.

15. The method according to claim 10, wherein the optical fiber is a single mode optical fiber.

16. The method according to claim 10, wherein the outer diameter of the optical core is 8.5 micrometers, the outer diameter of the optical fiber's inner optical cladding is 20 micrometers, the outer diameter of the optical fiber's intermediate cladding layer is 34 micrometers, and the diameter of the optical fiber's outer cladding is 125 micrometers.

17. The method according to claim 1, wherein the one or more glass-forming precursors used in step v) are a tetra silicon halide or a cyclopolydimethyl siloxane having the formula $[(CH_3)_2SiO]_y$, wherein y is 4, 5, or 6.

18. The method according to claim 1, wherein the one or more glass-forming precursors used in step v) include $SiCl_4$ or octamethylcyclotetrasiloxane (OMCTS).

19. The method according to claim 1, wherein:
in step ii), the inner optical cladding layer directly surrounds the optical core layer; and
in step v), intermediate cladding layer directly surrounds the inner optical cladding layer such that, within the solid rod, the intermediate cladding's inner diameter is the same as the inner optical cladding's outer diameter and the inner optical cladding's inner diameter is the same as the optical core's outer diameter.

20. The method according to claim 1, wherein the C/A ratio of at least 3.5 between the outer diameter of the preform's intermediate cladding layer (C) and the outer diameter of the preform's optical core (A) ensures sufficient distance between the preform's optical core and the preform's outer cladding so that in an optical fiber drawn from the preform attenuation does not noticeably increase at a wavelength of 1550 nanometers.

\* \* \* \* \*